(12) United States Patent
Chidlow

(10) Patent No.: US 10,500,906 B2
(45) Date of Patent: Dec. 10, 2019

(54) METHOD OF ESTIMATING LOAD ON A VEHICLE

(71) Applicant: BENTLEY MOTORS LIMITED, Cheshire (GB)

(72) Inventor: Jonathan Chidlow, Staffordshire (GB)

(73) Assignee: Bentley Motors Limited, Crewe, Cheshire (GB)

( * ) Notice: Subject to any disclaimer, the term of this patent is extended or adjusted under 35 U.S.C. 154(b) by 136 days.

(21) Appl. No.: 15/735,043

(22) PCT Filed: Jun. 8, 2016

(86) PCT No.: PCT/GB2016/051684
§ 371 (c)(1),
(2) Date: Dec. 8, 2017

(87) PCT Pub. No.: WO2016/198853
PCT Pub. Date: Dec. 15, 2016

(65) Prior Publication Data
US 2019/0047334 A1   Feb. 14, 2019

(30) Foreign Application Priority Data

Jun. 11, 2015 (GB) .................................. 1510156.1

(51) Int. Cl.
*B60C 23/00* (2006.01)
*B60C 23/04* (2006.01)

(52) U.S. Cl.
CPC ........ *B60C 23/0408* (2013.01); *B60C 23/002* (2013.01); *B60C 23/003* (2013.01); *B60C 23/004* (2013.01)

(58) Field of Classification Search
None
See application file for complete search history.

(56) References Cited

U.S. PATENT DOCUMENTS 5,355,924 A   10/1994 Olney
5,891,278 A   4/1999 Rivin
(Continued)

FOREIGN PATENT DOCUMENTS

DE    102010039854 A1    3/2012
EP       2896514 A2       7/2015
(Continued)

*Primary Examiner* — Andre J Allen
(74) *Attorney, Agent, or Firm* — Schwabe Williamson & Wyatt, P.C.

(57) ABSTRACT

The invention relates to a method of estimating the load on a motor vehicle (10). The motor vehicle (10) having a wheel (12) comprising a tread (20) for rolling over a surface being driven on (14) and a first air chamber (32) in which there is a gas which by means of its gas pressure (G) counteracts de-formation of the tread (20) when the wheel (12) is rolling. The method lets gas into the first air chamber 32 over a predetermined period and estimates the load based on the change in pressure in the chamber. The object under-lying the invention is to provide a means of estimating the load on a vehicle. For this purpose the wheel (12) may have a second air chamber (38) coupled to the first air chamber (32) by a valve device (44), the first air chamber (32) extending between the tread (20) and the second air chamber (38) and the gas may flow from the second air chamber (38) into the first air chamber (32).

16 Claims, 2 Drawing Sheets

(56) References Cited

U.S. PATENT DOCUMENTS

Figure 1:
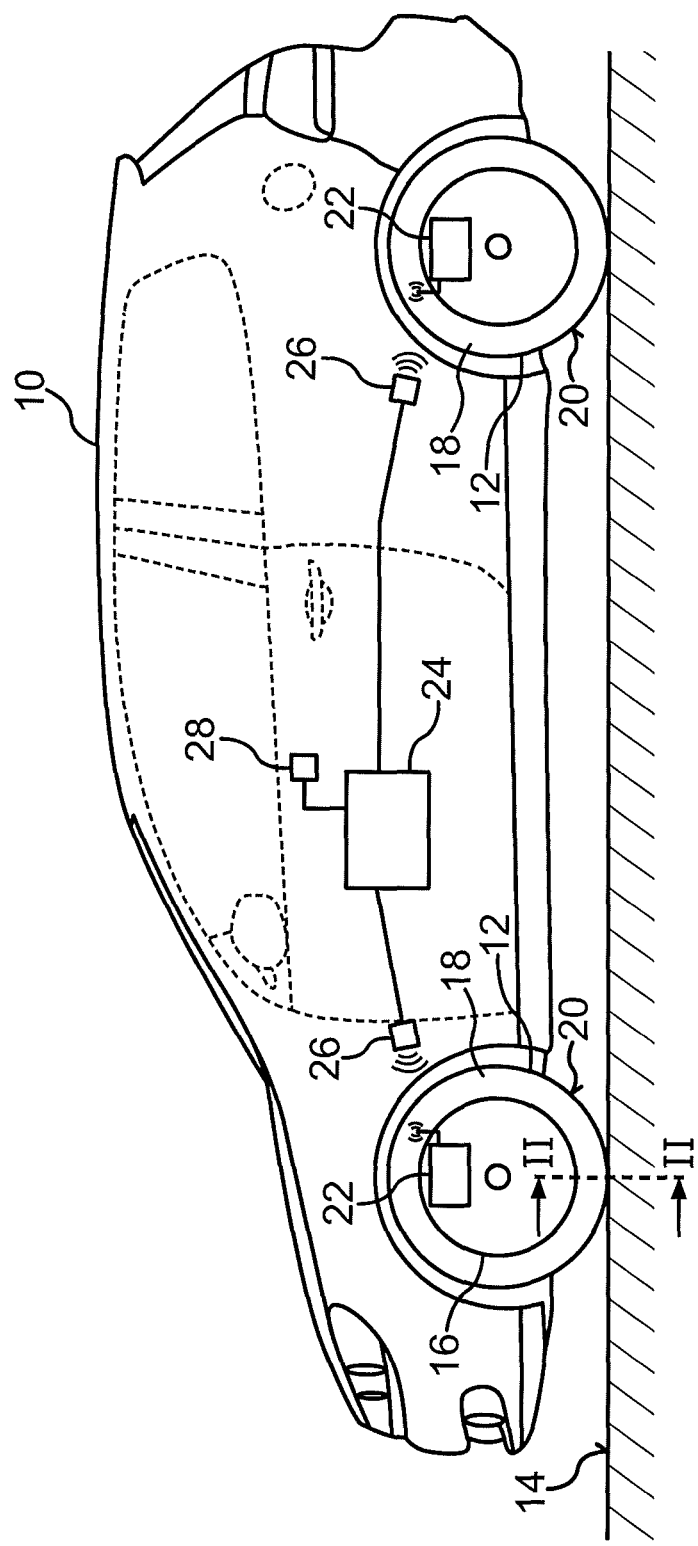

| | | | |
|---|---|---|---|
| 6,499,343 B1 | 12/2002 | Haas | |
| 2003/0144767 A1* | 7/2003 | Brachert | B60C 19/00 701/1 |
| 2003/0216845 A1* | 11/2003 | Williston | B60C 23/003 701/36 |
| 2007/0240501 A1* | 10/2007 | Mancosu | B60C 23/0408 73/146 |
| 2008/0156406 A1* | 7/2008 | Breed | B60C 23/041 152/415 |
| 2011/0272074 A1 | 11/2011 | Lowery | |
| 2012/0249319 A1* | 10/2012 | Schumacher | B60C 23/0476 340/442 |
| 2013/0125639 A1* | 5/2013 | Lemineur | B60C 23/04 73/146 |
| 2015/0202931 A1* | 7/2015 | Honig | B60C 23/001 152/416 |
| 2016/0288747 A1* | 10/2016 | Jensen | B60R 19/00 |
| 2017/0217261 A1* | 8/2017 | Mays | B60C 23/0479 |
| 2017/0355234 A1* | 12/2017 | Dharamshi | B60C 11/24 |

FOREIGN PATENT DOCUMENTS

| | | |
|---|---|---|
| JP | S58149806 A | 9/1983 |
| WO | WO9801310 A1 | 1/1998 |
| WO | WO2013139977 A1 | 9/2013 |

\* cited by examiner

METHOD OF ESTIMATING LOAD ON A VEHICLE

CROSS REFERENCE TO RELATED APPLICATIONS

The present application is a national phase entry under 35 U.S.C. § 371 of International Application No. PCT/GB2016/051684, filed Jun. 8, 2016, entitled "METHOD OF ESTIMATING LOAD ON A VEHICLE," which designated, among the various States, the United States of America, and which claims priority to GB 1510156.1 filed Jun. 11, 2015, both of which are hereby incorporated by reference.

The invention relates to a method of estimating the load carried by a vehicle. The vehicle has a wheel which has a tread for rolling over a surface being driven on and a first air chamber. Within this first air chamber there can be a gas the gas pressure of which causes the wheel to deform in a pre-defined manner as the tread rolls. This gas pressure is generally called tyre pressure.

Optimal tyre pressure is dependent on various factors, for example the surface that will be driven on (with soft surfaces generally requiring lower pressure), the speed at which the vehicle will be driven (with high speeds requiring higher pressure) and the load that the vehicle is carrying (with high loads requiring higher pressures).

Generally speaking these factors are determined by a user and tyre pressure is modified accordingly. However, alternative methods are known.

With a motor vehicle it may be necessary for off-road driving, for example through sand or other soft surfaces, to let air out of the tyres of the motor vehicle's wheels and in this way to considerably reduce the tyre pressure. After this off-road driving, when the motor vehicle is taken back onto the road, the air pressure must be increased again in order to continue travelling on the road. For this purpose however on the one hand a mobile compressor is then required, and on the other hand it generally takes an undesirably long time—with small compressors generally more than thirty minutes—until the generally four tyres have the desired gas pressure once again. In rain or other adverse weather and environmental conditions this process may even be additionally exacerbated.

In this regard DE 100 01 348 A1 discloses a system for filling the tyres while driving and which comprises a compressor located within the motor vehicle and which is connected to the tyres by pressure lines and rotating seals. An electromechanical tyre pressure regulating system then sets a target pressure in the tyre by means of the compressor.

DE 103 36 330 B3 discloses how a pressure change in a tyre may also be advantageous when applying the brakes in order to obtain improved longitudinal deceleration of the motor vehicle. For this purpose an imminent or existing critical driving dynamics situation is identified and the tyre pressure is varied dependently upon the situation identified.

DE 10 2010 040 539 A1 describes a motor vehicle that has a tyre pressure regulating system which adjusts the tyre pressure dependently upon a property of a roadway that is expected to be followed so as to thus, for example, adapt the rolling friction or the ground pressure distribution to the roadway.

One object underlying embodiments of the invention is to provide a method for adjusting the tyre pressure in a wheel for a vehicle depending upon the load that the vehicle is carrying.

Accordingly, in a first aspect of the invention there is provided a method of estimating the load carried by a vehicle, comprising the steps of: determining the gas pressure (G) of a gas in a first air chamber which counteracts deformation of a tread of a wheel: supplying a gas to the first air chamber from a source of gas at a higher pressure for a predetermined time: determining the new gas pressure (G'), or measuring the amount of gas flowing into the first chamber over the period; and estimating the load on the vehicle based on the change in gas pressure or amount of gas introduced.

When a vehicle is carrying a load and is connected to a given source of higher pressure gas, the first chamber which counteracts deformation of a tread of a wheel will inflate more slowly than when the vehicle is not carrying a load, because the air introduced into the first air chamber both inflates and lifts the vehicle. Accordingly, when starting from a defined, known pressure, the change in gas pressure, as represented by the increased gas pressure after the predetermined period, or the amount of gas that flows over that period (i.e. the rate of inflation) can be used to estimate the load on the vehicle.

The method may further comprise the step of determining based on the estimated load whether the gas pressure of the gas in the first gas chamber is optimal and, if the gas pressure is not optimal supplying more gas to the first gas chamber or releasing gas from the first gas chamber.

The method may be a method of estimating the load carried by a vehicle comprising carrying out the method defined above on a plurality of wheels and estimating the load on the vehicle based on the change in gas pressure in each wheel.

A more accurate result can be obtained by estimating based on a plurality of wheels, since load may not be evenly distributed.

The plurality of wheels may be at least four wheels. The plurality of wheels may include a plurality of wheels on each of a plurality of axles and a plurality of sides of a vehicle.

Using at least four wheels, especially where those wheels are on different axles and different sides of a vehicle can also indicate the distribution of the load, since for a given gas pressure, and a given supply pressure, the wheels bearing a greater load will experience a lower rate of inflation.

Hence the method may further comprise estimating the distribution of the load by comparing the increase in gas pressure in the first chamber, or the amount of gas flowing to the first chamber over the predetermined period in the plurality of wheels.

The source of gas at a higher pressure may be a second air chamber provided in the or each wheel and coupled to the first air chamber in the or each wheel by a valve device, the first air chamber extending between the tread and the second air chamber.

Preferably the method comprises the step of determining the pressure in the second chamber. Knowledge of the pressure in the second chamber (and hence the difference in pressure between the first and second chamber), is useful for estimating the load carried by the vehicle, since the amount of air flowing from the second chamber to the first chamber (hence the change of pressure in the first chamber) is dependent on the pressure differential between the chambers, as well as the load being carried, i.e. if the pressure differential is high, more air will flow over a predetermined period for a given load, than if the pressure differential is low.

Preferably the pressure in each first chamber is determined by a pressure sensor in the wheel. Alternatively the pressure is determined indirectly, e.g. by monitoring individual wheel rotational speeds and other signals available outside of the tyre itself. Alternatively the flow into the first chamber is determined using a flow meter.

In a second aspect of the invention there is provided a method of optimising tyre pressure based on load, the method comprising the steps of: determining the gas pressure (G) of a gas in a first air chamber which counteracts deformation of a tread of a wheel: supplying a gas to the first air chamber from a source of gas at a higher pressure for a predetermined time: determining the new gas pressure (G'), or measuring the amount of gas flowing into the first chamber over the period; and supplying more gas to the first gas chamber or releasing gas from the first gas chamber. based on the change in gas pressure, which is indicative of the load on the vehicle.

It will be appreciated that this method is based on the same theory as the first aspect of the invention, but omits the step of explicitly estimating the load and simply makes the changes based on the result of the measurements of flow or pressure change, which are dependent on the load on the vehicle. As such, any of the preferred features of the first aspect of the invention may apply equally to the second aspect of the invention.

Within the context of the invention an air chamber is to be understood as being a cavity which is closed off, gas-tight, by a chamber wall or a number of chamber walls. The second air chamber is preferably arranged here in relation to the tread, but lying on the inside radially. In other words this means that the first air chamber extends between the tread and the second air chamber. In this connection one means in particular by the term "between" that the arrangement from the intended axis of rotation of the wheel, as viewed radially outwards, is first of all the second air chamber, then at least part of the first air chamber, in particular part of its cavity for the gas, and then the tread delimiting the wheel radially outwards.

The second air chamber can now store a gas reservoir at high pressure, the high pressure being greater than the gas pressure. In other words, different gas pressures can be provided in the two air chambers. The gas can be air or some other gas provided specifically for filling the first and/or the second air chamber. Since the cavity of the first air chamber is still located between the second air chamber and the tread, the gas pressure of the first air chamber continues to act on the tread. In other words, the tread does not become hard or rigid due to the high pressure. In order to now increase the gas pressure in the first air chamber, the gas reservoir or part of it can be conveyed out of the second air chamber via the valve device into the first air chamber.

Accordingly, the method may further comprise the step of determining whether the gas pressure is optimal for the load determined and if the gas pressure is above optimal, releasing gas from the first air chamber, or if the gas pressure is below optimal, supplying gas to the first air chamber from the second air chamber.

It is an advantage of the invention that a gas reservoir at high pressure can be provided in the second air chamber independently of a currently desired tyre pressure, i.e. the gas pressure in the first air chamber, and so in order to increase the gas pressure in the first air chamber there is already sufficiently compressed gas in the second air chamber and so in this way no compression need be provided at the time of replenishing or filling the first air chamber, for example by means of a mobile compressor. The first air chamber can thus be brought relatively quickly to a desired target pressure value. Therefore, by means of the second air chamber means are provided for increasing the air pressure which manage without an additional pumping component because they comprise a high pressure gas reservoir.

Advantageously, the first air chamber is provided by conventional means, i.e. in particular by a tyre positioned over a rim of the wheel and that has the tread. The second air chamber can be provided by a hollow body located within the tyre and/or the rim. For example, a gas cartridge made of metal can therefore be fastened to the rim or be integrated into the latter. According to one embodiment the chamber walls of the second air chamber can be flexible and/or elastic in form, i.e. the hollow body can also be provided, for example, as a tube or a balloon within the tyre. Preferably, the hollow body is annular in form and so encompasses the rim. In this way any imbalance is avoided by the mass of the hollow body being arranged distributed rotationally symmetrically around the intended axis of rotation of the wheel.

A particular advantage is gained if the hollow body is located over a rim shoulder and/or a rim base of the rim, i.e. within the tyre, and between the rim and the tread of the tyre. In other words, the first air chamber and the second air chamber have a common chamber wall. The hollow body preferably rests in some areas here against a side wall of the tyre and in this way pushes the tyre against the rim. This increases the hold of the tyre against the rim. In other words, according to one embodiment of the invention an inner tyre, which forms the second air chamber, is located within an outer tyre which constitutes the first air chamber. The outer tyre is preferably clamped by the rim and the inner high pressure repository (i.e. the inner tyre), and is thus held securely because it can not slide off of the rim e.g. when taking a steep bend at high speed. In addition there is an aesthetic advantage (which can be particularly important for luxury vehicles) because all of the components are contained within the standard wheel. It is an additional advantage of this embodiment that in the prior art the ideal tyre pressure has to be determined on the basis of a large tyre cavity. With the embodiment according to the invention there is only a smaller outer cavity (the wall of which with the tread is flexible and must be adjusted optimally by the tyre pressure) and an inner cavity, namely the second air chamber, with relatively rigid walls. From a dynamic performance point of view this dual chamber tyre can be optimised more easily due to the smaller degree of freedom if one is seeking to calibrate the tyre pressure.

According to another further development of the invention the hollow body projects over the rim radially outwards. In other words, a diameter of the hollow body or an outer dimension or an outer circumference is greater than that of the rim. This gives rise to an emergency operation feature of the hollow body, i.e. even with a damaged first air chamber when the gas is escaping from the first air chamber, it is not the rim that is sitting on the surface being driven on, but the hollow body.

According to another further development the valve device has a three-way valve which, in addition to a channel which connects the first and the second air chamber to one another, has a channel which is designed to guide a flow of gas between a pumping device of the wheel and/or an area surrounding the wheel on the one hand and the second air chamber on the other hand. In this way one gains the advantage that the second air chamber can be filled with gas by the valve device, a pumping device of the wheel and/or also an external compressor device being able to be used for this purpose, and which, for example, can be connected to the channel when one stops at a filling station. With a three-way valve the first air chamber remains closed here.

In order to increase the gas pressure in the first air chamber provision can be made such that a user operates the valve device manually, and in this way opens the second air chamber towards the first air chamber. Preferably however, the valve device has an actuator which is designed to switch the valve device between an open position and a closed position dependently upon a control signal, the gas valve in the open position being passable in at least one direction, i.e. for a flow of gas from the second air chamber into the first air chamber, and in the closed position closing off the second air chamber. If the second air chamber is filled with a gas reservoir at high pressure, by changing from the closed position to the open position, gas from the gas reservoir can escape into the first air chamber, by means of which the gas pressure in the first air chamber then increases. The actuator can have e.g. an electric motor and/or a piezo element and/or a pneumatic element. The control signal can be transmitted to the valve device by wire or wirelessly. The control signal can be produced, for example, by remote control which can be made, for example, to be portable so that a user can carry it with him, or the remote control can be installed in the vehicle.

The control signal may control the flow of gas to carry out the method of estimating the load as set out above and preferably the method of determining whether the gas pressure is optimal having regard to the load and supplying gas to the first air chamber if the gas pressure is below the optimal.

Another advantage of this system is the capability to ensure that the tyres have an optimal pressure in the first air chamber at all times, in particular when driving, by means of which the rolling characteristics are determined. Small deviations of the tyre pressure away from the optimal pressure value are continuously evened out. This improves fuel economy and/or safety, depending on the chosen optimisation criterion for the optimal pressure value. In addition, it can be ensured that the tyre is continuously adapted with optimal pressure at any time during the journey, in particular by independently inflating if the vehicle speed is significantly increased. The capability of regulating the tyre pressure in the first air chamber, even when driving the vehicle, i.e. keeping it proactively at a predetermined target pressure value that is optimal, e.g. in relation to fuel consumption, results in a cost advantage, for example for commercial fleets of trucks. A saving of 10% has been estimated here. By an optimal tyre pressure nearly always being able to be set for a tyre, on the basis of the load and these other factors, there is also considerably less wear and likelihood of failure, and this prevents high follow-up costs, in particular with large construction machines, such as e.g. diggers, that occur when construction activities have to be interrupted due to the failure of a construction machine.

The control signal can also be generated by a tyre pressure regulating system of the wheel itself. For this purpose one further development of the invention makes provision such that the wheel has an electronic pressure regulating system which is designed to adjust the gas pressure in the first air chamber by means of a gas reservoir stored in the second air chamber and that has a higher or greater pressure in comparison to the gas pressure, i.e. high pressure, to a target pressure value by generating the control signal. The target pressure value is specified according to a predetermined optimisation criterion. The optimisation criterion is in particular related to the load and may be stress related (low material stress), related to wear, comfort, safety, economy, or function (e.g. off-road driving/on-road driving/high-speed driving), or is also related to a combination of these optimisation aspects. The target pressure value is dependent on load and preferably specified here dependently upon speed and/or driving mode and/or operation. In this connection speed-dependent means that the target pressure value is specified dependently upon a driving speed of the vehicle to which the wheel is fitted and/or upon a rolling speed of the wheel. In this way the target pressure value is advantageously set to an optimal value for the respective driving speed which can, for example, be higher for a journey at higher speed than for a journey at lower speed. For example, for a journey with no (additional) load, a target pressure value of for example 2.5 bar can be specified for a speed of less than 70 km/h, and a target pressure value of greater than 2.5 bar, for example 3.0 bar, can be specified for a driving speed of more than 70 km/h. Whereas if a full load (e.g. an extra 500 kg) is detected, this could be increased such that a target pressure value of for example 3.0 bar can be specified for a speed of less than 70 km/h, and a target pressure value of greater than 3.0 bar, for example 3.5 bar, can be specified for a driving speed of more than 70 km/h. A load dependent and driving mode-dependent target pressure value can be produced, for example, if one anticipates an on-road driving mode for driving over asphalt or some other solid surface, and an off-road driving mode (target pressure value when unloaded of less than e.g. 2.0 bar, in particular less than 1.5 bar and when loaded of less than e.g. 2.5 bar, in particular less than 2.0 bar) for driving through sand or some other soft surface. Operation-dependent means here that a user brings about a change to the target pressure value by an operational action, for example by pressing a button.

In order to estimate the load, the method set out above is carried out. Having determined the estimated load, the target pressure value is determined, and the control signal is generated to adjust the pressure.

The pressure regulating system is preferably also designed, so as to reduce the gas pressure in the first air chamber by means of an additional control signal, to bring the valve device into an outlet position in which the first air chamber is open to an area surrounding the wheel. The gas can then escape from the first air chamber into the surrounding area. By means of this embodiment means for increasing, reducing and optimising the air pressure are therefore provided which manage without any additional pumping component which would have to adjust the tyre pressure directly.

In order to fill the second air chamber, i.e. in order to introduce and/or top up the gas reservoir, provision can be made such that the wheel is coupled in the manner described to an external compressor or an external reservoir so that a flow of gas flows into the second air chamber. According to one embodiment of the invention, however, a filling device is provided in the wheel itself. For this purpose the filling device is designed to fill the second air chamber with a gas constituting the gas reservoir.

The filling device can be in different forms here, and this is why there are additional embodiments of the invention. One embodiment makes provision for a motor-driven compressor which can be fastened, for example, to a rim of the wheel. In addition or alternatively, provision can be made such that the filling device has a pumping system driven mechanically by the rolling. For example, there can be integrated into side walls of a tyre of the wheel cavities or hollows which are compressed if there is a flexing movement of the tyre while rolling and so there is a change to their volume, by means of which the gas located within the cavities is compressed. The cavities can be coupled by a respective valve to the second air chamber, by means of which the compressed gas is pressed into the second air chamber. As the rolling continues every cavity can then expand and in so doing suck in air, for example from the surrounding area, via a respective additional valve. The valves can respectively be formed, for example, by a membrane. In another embodiment chemical gas generation is additionally or alternatively provided. For example therefore, a tank or storage container can be provided with one or more chemicals which react such as to generate a gas which is stored in the second air chamber as a gas reservoir. A mechanical pumping device can be provided which, for example, uses a relative movement of the tyre in relation to the vehicle body or vehicle chassis in order to apply a mechanical force to a pump mechanism disposed on the wheel in order to drive the latter. A flow-based pumping device can also be provided in which e.g. there is generated in a pipe and/or by means of an air conveying element a back pressure which is great enough to press accumulated ambient air into the second chamber against the high pressure of the latter. Air is thus tapped from the surrounding air by the rolling wheel, for example by an aerodynamic spoiler that either pushes air into the wheel or, like a windmill, drives a shaft of a pump or an eccentric cam mounted on a hub, which pushes a small amount of air into the second air chamber with each rotation. The inner reservoir is thus also "recharged", i.e. the pressure is even regenerated here, during the journey, and so manual filling, e.g. at a fuel station, becomes unnecessary.

The invention also includes a vehicle which is adapted to carry out the method of the invention (including any preferred aspects). The vehicle may be further characterised by at least one wheel which constitutes an embodiment of the wheel according to the invention. Preferably, the vehicle has four wheels which respectively constitute an embodiment of the wheel according to the invention. In particular, the vehicle is configured as a motor vehicle, such as for example an automobile, in particular a truck or a car or a construction vehicle or some other construction or working machine. The vehicle according to the invention can however also be in the form of a trailer or an aircraft. The invention can be applied to all modes of transport which have pneumatic tyres, e.g. air-filled tyres, in particular where safety and economy are important (e.g. military, aircraft, agriculture, mining, utility vehicles).

The invention also provides a control device operable to estimate the load carried by a vehicle and/or optimise the tyre pressure based on the load, the control device operable to receive a signal indicative of the gas pressure (G) of a gas in a first air chamber which counteracts deformation of a tread of a wheel and operable to control the supply of gas to the first air chamber from a source of gas at a higher pressure for a predetermined time; wherein the control device is operable to receive a signal indicative of the new gas pressure (G'), or the amount of gas flowing into the first chamber over the period; and operable to estimate the load on the vehicle based on the change in gas pressure or the amount of gas introduced.

The control device may be further operable to cause a valve to release or introduce gas from, or to, the first air chamber to optimise the gas pressure based on the estimated load, or is operable to emit a signal to display the estimated load.

A further development of the vehicle according to the invention makes provision such that the vehicle has a control device located a distance away from the at least one wheel, e.g. in a control unit, which is set up to estimate the load on each wheel as set out above and to control the respective valve device of each wheel and in this way to set the gas pressure in dependence on the estimated load and also to a speed-dependently and/or driving mode-dependently and/or operation-dependently specified target pressure value. The specified speed- and/or driving mode-dependent target value corresponds here to the method already described. Due to the fact that the control device is disposed in the vehicle a distance away from the wheel it is possible for the driver of the vehicle to be provided with a particularly advantageous tyre pressure for the present or current driving situation in the first air chamber of every wheel, for example during a journey, i.e. when the vehicle is rolling. The gas pressure in the first air chamber can also be adjusted operation-dependently, i.e. the user can initiate a change to the target pressure value by means of an operating device of the vehicle so that the control device sets the appropriate gas pressure in the tyres.

Preferably the control device is set up to estimate the load on each wheel when the vehicle is stationary. Preferably the control device is set up to set the gas pressure to a specific target pressure value when the vehicle is in motion.

The vehicle can of course also have a mobile compressor, as described at the start, and with which the second air chamber can be topped up.

Finally, the invention also includes a method for adjusting a specified target pressure value of a gas pressure of a gas in a first air chamber of a wheel dependent on the load. In the method, the load is estimated as set out above and a gas reservoir with a higher high pressure in the wheel in comparison to the gas pressure of the first air chamber is provided, in the described manner, in a second air chamber of the wheel, and in order to increase the gas pressure at least part of the gas reservoir is delivered from the second air chamber to the first air chamber, and in order to reduce the gas pressure at least part of the gas is discharged from the first air chamber into an area surrounding the wheel.

The invention also includes further developments of the method according to the invention which have features as already described in connection with the further developments of the wheel according to the invention. For this reason the corresponding further developments of the method according to the invention are not described again here.

Figure 2:
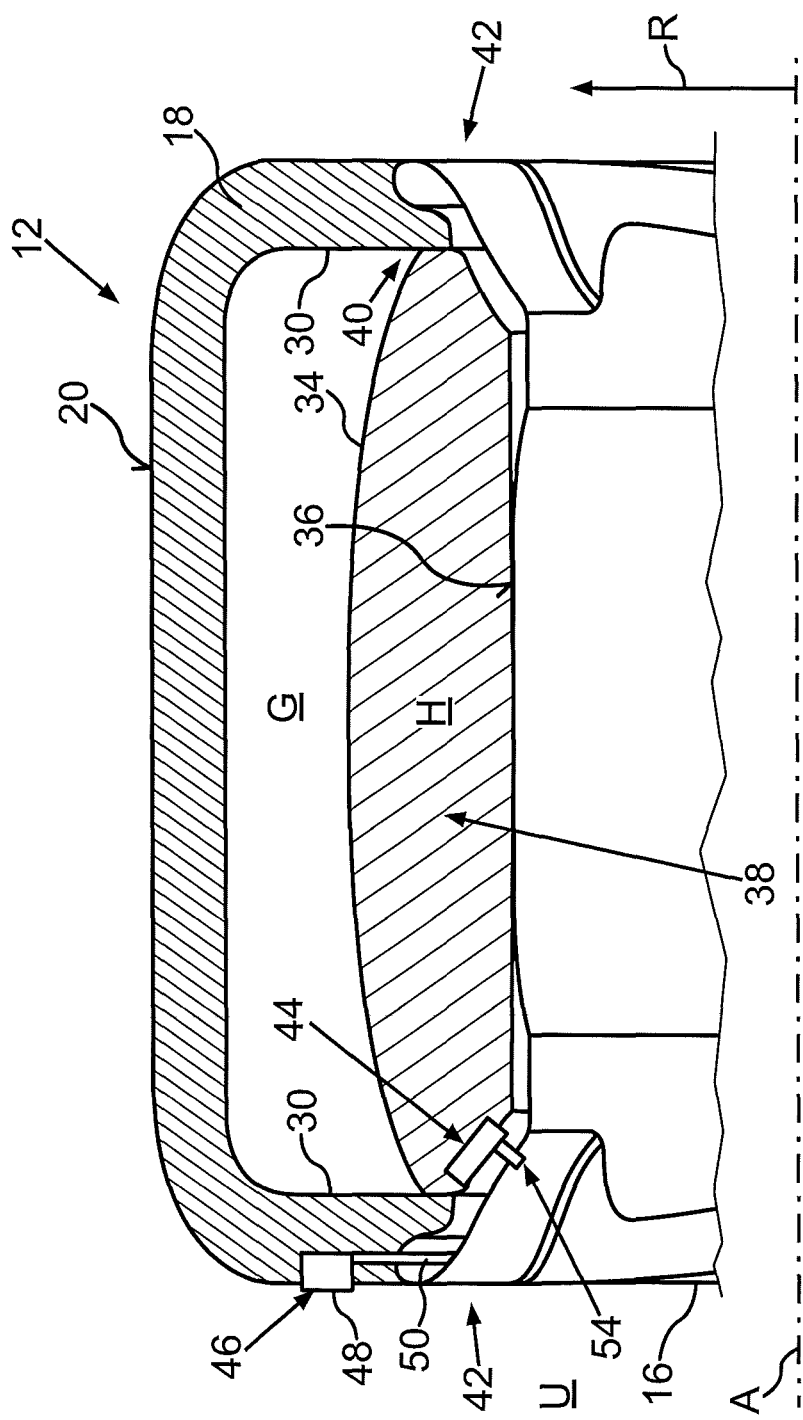

In the following an exemplary embodiment of the invention is described. Shown with regard to this are as follows:

FIG. 1 a diagrammatic illustration of an embodiment of the vehicle according to the invention, and FIG. 2 a diagrammatic sectional view of an embodiment of the wheel according to the invention, as can be provided in the vehicle of FIG. 1.

The exemplary embodiment described below is a preferred embodiment of the invention. In the exemplary embodiment, however, the components of the embodiment described respectively constitute individual features of the invention which are to be considered independently of one another, which however also further develop the invention independently of one another and so are also to be considered individually or in a combination different from the one shown as a component part of the invention. Furthermore, the embodiment described can also be supplemented by other features of the invention which have already been described.

In FIG. 1 a motor vehicle 10 is shown which can be, for example, a truck or a car, such as for example an SUV (Sport Utility Vehicle). The motor vehicle 10 can have, in a manner known in its own right, four wheels 12 which are mounted rotatably about a respective axis of rotation and by means of which the motor vehicle 10 can roll over a surface being driven on 14, for example a road or sandy terrain. The wheels 12 can also be designed in the same way, and this is why FIG. 1 only gives a common reference number 12 for the wheels. Each wheel 12 can have a rim 16 and a tyre 18 with a tread 20. The rim 16 can be formed from metal, and the tyre 18, for example, from rubber or some other flexible material. The tread 20 can have a profile in a known manner.

With the motor vehicle 10 it is possible to adjust a tyre pressure in each tyre 18 with little effort, and so the resilience or the flexibility of the tyre 18 when rolling over the surface being driven on 14 can be changed with little effort. With a high tyre pressure the tread 20 deforms less than with a lower tyre pressure when rolling, in other words deformation e.g. due to flexing or due to the weight of the chassis of the motor vehicle 10 becomes less as the tyre pressure increases.

In order to adjust its tyre pressure every tyre 18 can have a tyre pressure filling system 22 that adjusts the tyre pressure in the tyre 18 either independently or in cooperation with a control device 24. In one embodiment the filling system 22 can be operated manually by a user when the motor vehicle 10 is at a standstill. In another embodiment the tyre pressure is automatically adjusted by the filling system 22, for example speed- and/or driving mode-dependently. In another embodiment the filling system 22 receives control commands from the control device 24 by means of which a target pressure value is specified for the tyre pressure which is then reset by the filling system 22. The control device 24 can be provided, for example, by a control unit of the motor vehicle 10. Data transmission and/or control signal transmission can take place for example, as shown in FIG. 1, wirelessly via a respective communication device 26 which can be based, for example, on RFID technology (RFID—Radio Frequency Identification) or NFC technology (NFC—Near Field Communication). There can also be provided in the motor vehicle 10 an operating device 28 by means of which a user (not shown) of the motor vehicle 10 can set a driving mode, for example an off-road mode and/or a road mode and/or a fast driving mode, the tyre pressure being the lowest in the off-road mode and being the highest in the fast driving mode. A respective power supply for operation of the filling system 22 can be provided, for example, by a battery or an on-board supply system of the motor vehicle, in the last case electrical energy for this purpose being able to be transferred via slip rings or inductively to every wheel 12 or being able to be generated in the respective wheel 12, e.g. by mechanically driving an electrical machine in generator operation, e.g. a hub dynamo, or by generating electrical pulses by means of a piezo element that is repeatedly pressed by the rolling motion of the tyre.

By means of the filling system 22 a valve device in the respective wheel 12, for example, can be controlled. This is described in more detail below in connection with FIG. 2.

FIG. 2 shows a cross section through an individual wheel 12. A profile of the cross section is illustrated in FIG. 1 by section line II-II.

FIG. 2 shows the rim 16 on which the tyre 18 is mounted. With its tread 20 and side walls 30 the tyre 18 defines a first air chamber 32, i.e. the tread 20 and the side walls 30 enclose a cavity in which a gas, for example air, is located, the gas pressure G of which constitutes the tyre pressure. Furthermore, in the example shown there is located in the tyre 18 a cavity 34 which can be a tube arranged circumferentially over a rim shoulder 36 of the rim 16, made for example of a flexible and/or elastic material, e.g. with rubber or caoutchouc. The hollow body 34 is arranged lying radially inwards, and so the first air chamber 32 is located between the tread 20 and the hollow body 34. In other words, the hollow body 34 is arranged lying radially inwards in relation to the intended axis of rotation A of the wheel 12 and passing from the axis of rotation A in a radial direction R, the hollow body 34 being a smaller distance away from the axis of rotation A than the first air chamber 32 and the tread 20 delimiting the wheel 12 to the outside in the radial direction R. In particular, the hollow body 34 has a toroidal basic shape, i.e. it is configured substantially rotationally symmetrically as a torus and is arranged rotationally symmetrically about the axis of rotation A.

The hollow body 34 forms a second air chamber 38 in which a gas reservoir at high pressure H can be stored, the high pressure H being a gas pressure that is greater than the gas pressure G. A gas of the same type as the gas in the first air chamber 32, for example, can be stored in the second air chamber 38. The hollow body 34 can press against contact regions 40 of the side wall 30 in some areas so that the side walls 30 are in turn pressed against edge regions 42 of the rim 16. Due to this, the side walls 30 sit particularly securely against the rim 16.

Furthermore, the tyre 12 can have a valve device 44, for example a three-way valve. A filling device 46 can also be provided which can comprise, for example, one or a number of cavities 48 which can be formed in the side walls 30. The filling device 46 can be connected to the valve device 44 via a channel 50 so that a gas can be conveyed from the filling device 46 through the channel 50 into the second air chamber 38. The second air chamber 38 and the first air chamber 32 are also connected by a channel via the valve device 44. There can also be provided an outlet channel 52 by means of which gas can be let out of the first air chamber 32 via the valve device 44 into an area U surrounding the wheel 12, i.e. into the ambient air.

The valve device 44 can be operated manually, and so it provides the filling system 22 on its own. The valve device 44 can also have an actuator (not shown), for example a piezo element or an electric motor, the actuator being configured such as to be able to be controlled by a control signal, and the control signal being able to be generated by electronics (not shown) of the filling system 22 in the manner described below.

The air reservoir or generally the gas reservoir in the second air chamber 38 is used to adapt the current tyre pressure, i.e. the gas pressure G, in the wheel 12 as required. The filling of the reservoir in the second air chamber 38 can easily take place at a service station or, as a further expansion stage, on board by means, for example, of the pumping device 46. If so required it is therefore possible (for example after the off road journeys described) to increase the gas pressure G again within a relatively short period of time, for example in less than a minute, by gas being conveyed from the second air chamber 38 into the first air chamber 32 via the valve device 44. With a corresponding embodiment of the air reservoir, if a tyre is damaged the emergency operating features are improved and the damage to the rim 16 can be reduced. For this purpose provision can be made such that the hollow body 34 projects over the rim 16 in the radial direction R.

The provision of the hollow body 34 constitutes a simple, robust and inexpensive solution with which one can dispense with an elaborate onboard filling system, which provides a sufficiently high compression performance in order to be able to increase the gas pressure G in the same time. The hollow body 34 can be installed in a conventional mounting of the wheel 12 in the rim. Even a retrofittable solution can be provided. By means of the rim 16 projecting over through the hollow body 34 an emergency operating feature is also improved if a tyre is damaged.

The simplest solution is an air reservoir with a valve of the valve device 44 that is to be operated manually so as to allow air to escape from the second air chamber 38 into the tyre 18, i.e. the first air chamber 32, and to thus increase the air pressure in the first air chamber 32. The additional expansion stages are a remote control, automatic air pressure adaptation and a combination of automatic air pressure adaptation in conjunction with an onboard filling system, such as for example the pumping device 46 or a compressor (not shown) fastened to the rim 16 or a compressor located within the motor vehicle and which is connected to the wheel by tubes and/or pipes.

For the wheel 12 the rim 16 and the tyre 18 can be configured in the way known from the prior art. In order to provide an embodiment according to the invention of the wheel 12 an additional pressure reservoir in the form of the hollow body 34 is then to be provided in which air, for example, is stored at high pressure. Furthermore, the valve device 44, for example a three-way valve, is to be provided so as in this way to enable the gas pressure G in the first air chamber 32 to be increased and decreased. Corresponding electronics of the filling system 22 can also be provided in the valve device 44, by means of which tyre pressure regulation integrated into the wheel 12 can also be provided. Preferably, there is also provided in the valve device 44 a pumping device 46 which, in the manner described, can for example be a mechanically operated pump which is driven, for example, by deformation of the tyre 18 with a flexing movement. With the pumping device 46 the high pressure H is tracked in the second air chamber 38. As shown in FIG. 2, the pumping device 46 can be integrated into the tyre 18, but it can also be located in a different position of the wheel 1, for example on the rim 16.

Load Estimation

When the wheel 12 is fitted on the motor vehicle 10 and the tyre pressure has a normal operating pressure value for daily use, for example in a range of from 2.2 to 2.7 bar, in particular 2.5 bar, the following cycle can be implemented to estimate the load on the vehicle 10: (i) the tyre pressure (i.e. the gas pressure G in the first chamber 32) is sensed by, for example, the filling system 22, in a way known in its own right, e.g. either an iTPMS (indirect tyre pressure monitoring system) or preferably a dTPMS (direct tyre pressure monitoring system); (ii) the pressure (H) in the second chamber 38 is sensed by the filling system 22 in a way known in its own right (such as a direct pressure sensor); (iii) the valve device 44 is operated to allow gas to flow from the second air chamber 38 to the first chamber 32 for a predetermined period P; (iv) the new tyre pressure (G') is sensed; and (v) the load on the vehicle 10 is estimated based on the change in gas pressure.

The estimation of the load based on the change in gas pressure may be carried out by reference to a comparison table. The comparison table may be calibrated for each vehicle 10, or be pre-installed based on the model of vehicle 10, which has a known weight when unloaded. An exemplary table is set out below in table 1, but of course, the table will differ depending on the kerb weight of the vehicle, the size of the aperture in the valve etc. and those skilled in the art will be able to prepare suitable comparison tables accordingly.

TABLE 1

| Original Tyre Pressure G (Bar) | Second Chamber Pressure H (Bar) | Predetermined Period P (Seconds) | New Tyre Pressure G' (Bar) | Load (kg) |
| --- | --- | --- | --- | --- |
| 2.50 | 5.0 | 1 | 2.60 | 0 |
| 2.50 | 5.0 | 1 | 2.56 | 250 |
| 2.50 | 5.0 | 1 | 2.52 | 500 |

In an alternative, the cycle for estimating the load on the vehicle 10 may be implemented as follows: (i) the tyre pressure (i.e. the gas pressure G in the first chamber 32) is sensed by, for example, the filling system 22, in a way known in its own right, e.g. either an iTPMS (indirect tyre pressure monitoring system) or preferably a dTPMS (direct tyre pressure monitoring system); (ii) the pressure (H) in the second chamber 38 is sensed by the filling system 22 in a way known in its own right (such as a direct pressure sensor); (iii) the valve device 44 is operated to allow gas to flow from the second air chamber 38 to the first chamber 32 for a predetermined period P; (iv) the volume of gas V passing from the second chamber to the first chamber is sensed (again by known means, such as a flowmeter; and (v) the load on the vehicle 10 is estimated based on the change in gas pressure.

The estimation of the load based on the change in gas pressure (as measured in terms of the amount of gas passing from the second chamber 38 to the first chamber 32) may be carried out by reference to a comparison table. The comparison table may be calibrated for each vehicle 10, or be preinstalled based on the model of vehicle 10, which has a known weight when unloaded. An exemplary table is set out below in table 2:

TABLE 2

| Original Tyre Pressure G (Pa) | Second Chamber Pressure H (Pa) | Predetermined Period P (Seconds) | Volume of Gas Flow V (qualitative) | Load (kg) |
| --- | --- | --- | --- | --- |
| 2.50 | 5.0 | 1 | High | 0 |
| 2.50 | 5.0 | 1 | Medium | 250 |
| 2.50 | 5.0 | 1 | Lower | 500 |

Of course, the tables above are by way of example only and not intended to be accurate for any particular vehicle 10. Similarly, they are not representative of all the possible sets of values that might be compared—for example, in table 1, rather than looking at the new tyre pressure G', which is representative of the change in gas pressure, one could look at the difference in gas pressure, i.e. the value of the new tyre pressure G' minus the original tyre pressure G. Furthermore, the tables could be replaced by graphs or algorithms.

The load estimation discussed above is preferably conducted when the vehicle 10 is stationary, to avoid the influence of downforce on a travelling vehicle 10. It may be conducted each time the vehicle 10 is started. Alternatively, it may be conducted in response to a user initiated action, e.g. pressing a button (not shown) in the vehicle 10, in order to avoid delaying travel by carrying out the load estimation method unnecessarily.

Tyre Pressure Optimisation

Once the load on the vehicle 10 has been estimated by one of the methods discussed above, a further control cycle is carried out to ensure that the tyre pressure is optimal. In the further control cycle, the following steps are carried out: (i), the load on the vehicle 10 is inputted to a comparison table (not shown) and (ii) an optimal tyre pressure corresponding to that load may be read from the table, then (iii), the actual tyre pressure (G') is compared to the optimal tyre pressure and the difference is determined; and (iv-a) if the actual tyre pressure G' is lower than the optimal pressure, the filling system 22 is actuated to operate the valve device 44 to allow a corresponding amount of gas to flow from the second air chamber 38 to the first air chamber 32 to bring the actual gas pressure to the optimal gas pressure; or (iv-b) if the actual tyre pressure G' is higher than the optimal pressure, the filling system 22 is actuated to operate the valve device 44 to allow a corresponding amount of gas to flow from the first air chamber 32 to the outside atmosphere to bring the actual gas pressure to the optimal gas pressure.

This further optimisation cycle is preferably conducted dynamically to optimise the tyre pressure based on additional factors. Thus, the following control cycle can be implemented for the tyre pressure. As soon as the motor vehicle 10 is travelling at a higher driving speed, for example at a speed of more than 70 km/h, the tyre pressure can be sensed in stages or continuously by, for example, the filling system 22 in a way known in its own right, and as the driving speed increases the tyre pressure can be increased to a predetermined tyre pressure that is optimal for the driving speed and the given load. During a motorway journey at a speed of more than 100 km/h, with a load of e.g. one tonne, a tyre pressure of, for example, 3.0 bar can be provided. The filling system 22 can then control the valve device 44 accordingly in order to bring about an overflow of air from the second air chamber 38 into the first air chamber 32 so that the tyre pressure increases to the specified target pressure value, and so in the example to 3.0 bar.

In this way the gas pressure in the second air chamber 38 is reduced. While the motor vehicle 10 continues on its way, the gas pressure in the second air chamber 38 is increased to a predetermined high pressure target value by the pumping device 46.

If the motor vehicle 10 is now driven even faster or also is driven, for example, cross-country or is operated in some other way that stresses the wheel 12 more than when being driven on the road, this can also once again be detected by the electronics of the filling system 22. The regulating cycle described can now be repeated, even more air then being released from the second air chamber 38 into the first air chamber 32 so that the tyre pressure achieves a higher target pressure value specified for the new driving situation. The pumping device 46 can then increase the high pressure H in the second air chamber 38 again.

If the motor vehicle 10 then travels more slowly again, in a simpler regulating cycle the tyre pressure, i.e. the gas pressure G, can be reduced. If the average driving speed decreases for a predetermined period of time, i.e. it is lower than in the previous driving situation, or if, for example, it is identified by a position determining system, such as for example a GPS (Global Positioning System) and/or a navigation system that the current driving route passes through an area in which a lower average driving speed is required, such as for example in a town or in a part of a town with a speed limit, the valve device 44 will be activated by the filling system 22 to the effect that air escapes from the air chamber 32 into the surrounding area U so that the tyre pressure decreases and in this way more comfortable drive characteristics of the tyre 18 are achieved because the latter now has more spring than with a high tyre pressure. With this regulating process the gas pressure in the second air chamber 38 is not reduced significantly.

With off-road use of the vehicle the sensor allows the air pressure in the outer air chamber of the tyre to fall to 1.0 bar. After the off-road use the sensor uses the valve to allow air to pass (very quickly) from the inner reservoir to the outer tyre air chamber and so re-establishes the required on-road tyre pressure very quickly and easily. Of course this leads to a significant emptying of the inner reservoir as purely speed-dependent fine settings of the tyre pressure. Therefore, in this case it takes rather more time for the mechanical membrane to re-establish the high pressure of the inner reservoir.

In view of these functions and wheel electronics which have been calibrated both for the wheel/tyre combination to which they have been fitted, as well as for the vehicle in which they are installed, the complete tyre pressure monitoring system and load measuring system is no longer required and can be removed from the vehicle.

The tyres then simply become components that are "fitted and then forgotten" and do not require any maintenance. Nevertheless, their optimal tyre pressure is always automatically sustained. The only exception here would be a malfunction of the wheel electronics to which the driver's attention must then be drawn. Provision is made such that this would take place by means of a radio frequency response to a given vehicle function (for example a Mayday signal would be received by a keyless entry antenna).

Of course, those skilled in the art will be well aware that the optimal gas pressure of all the tyres 18 is not necessarily the same, so for example where a vehicle 10 has four wheels 12, two on each axle, the pressure of tyres 18 on one axle may be optimised to a different pressure to those on the other axle.

Moreover, in such a vehicle 10, with a plurality of (e.g. four) wheels 12, the load on each wheel 12 might not be identical. Accordingly, following the load estimation cycle discussed above may be carried out for each of the (e.g.) four wheels 12 and the load can be better estimated by taking an average (mean) of the result for each wheel 12, then carrying out the optimisation procedure to bring each wheel 12 to the optimised gas pressure.

Another feature of the invention is to carry out the load estimation cycle discussed above for each of a plurality of wheels 12, then to compare the difference in load on each wheel 12 and, where the difference is above a predetermined threshold, to output a result, e.g. a visual indication, e.g. on a dashboard (not shown) or an audible indication that the load is unbalanced. The wheels 12 that are compared may be those on the same axle, in order to determine an imbalance across the width of the vehicle 10, and wheels 12 on the same side of the vehicle 10 may be compared to determine an imbalance between the front and rear of the vehicle 10.

This further development is a new type of approach to finding a solution, is more cost-efficient and more practicable with regard to implementation. It essentially aims to maintain the safety of a tyre rather than to react and warn the driver if his safety is compromised. Unlike with earlier manual optimisation systems, this is no longer regulated manually at regular intervals to such an extent, but in fact is automatically optimised on a permanent basis. This reduces the complexity and the component requirement of earlier implementations and makes it easy to give up existing vehicle systems and components, namely the tyre pressure monitoring system and the spare tyre.

Its implementation includes some totally new characteristics and so constitutes a significant step forwards:

Above all, in the preferred system, it does not require an electric pump and makes use of currently available technologies in order to enable automatic control of the tyre pressure based upon the load on the vehicle. Essentially, these tyres, once fitted, automatically adapt themselves in an efficient way to all driving conditions and so always have the optimal tyre pressure without any human intervention.

Furthermore, this self-adaptation takes place in due time for two reasons:

Since in every driving cycle scenario the air is first of all conveyed efficiently from areas with higher pressure to areas with lower pressure, it is not limited by the speed of the (electric) pump; since, secondly, the inner reservoir takes up a certain area of the conventional tyre air chamber, the volume of air that must flow to and away from this chamber is reduced.

Furthermore, provision is made such that a spare tyre is no longer required for the following reasons:

Since, first of all, the inner reservoir always has the optimal tyre pressure, the likelihood of failure due to excessively low air pressure/overheating is considerably reduced/ totally ruled out.

Secondly, the physical properties of the inner reservoir offer the tyre bead a mechanical supporting effect—this is now effectively held between the outer steel of the wheel and the inner material of the (high pressure) reservoir. In this case the likelihood of the tyre becoming loose is likewise considerably reduced/ruled out.

With reference, thirdly, to the remaining failure mode, i.e. puncture of the outer tyre: with the exception of highly dramatic flat tyres, the inner reservoir remains intact while only the pressure in the outer tyre air chamber is lost. This makes available a type of design-specific "emergency operation capacity", but it must be established that the inner reservoir supports the outer tyre physically. If the outer tyre disintegrates, the inner reservoir is nevertheless stable and projects over the steel rims and makes available an emergency operation capacity, even if this is very limited.

Finally, provision is made such that these wheel and tyre units actually become maintenance-free as soon as they are totally validated and established. Therefore, an additional tyre pressure monitoring system is no longer required either.

A number of different embodiments of the high pressure reservoir are provided, three examples of which are described below.

With a standard wheel design:

a) a bellows made of reinforced material, designed to limit the inner reservoir in the fully pumped up state to the shape shown in FIG. 2;

b) an embodiment with a rubber mixture, similar to a conventional tyre, with a rigid outer circumference, but thin-walled/collapsible inner circumference;

or with a modified wheel design:

c) a truly tube-free tyre, which provides the inner reservoir in exactly the same way as a conventional tyre air chamber is provided, only with a smaller overall circumference.

The production process relating to the assembly is approximately the same for each of the options specified above, but could also be adapted to the respective design. It is provided as follows:

standard wheels and tyres can be produced as usual,
the inner reservoir can be drawn onto the steel rim,
connections can be made to the valve and to the mechanical membrane,
the tyre can then be fitted as usual (it is pushed over the wheel rim and then inner reservoir),
the inner reservoir can be pumped up e.g. to 3.0 bar,
the shape/contour of the pumped up reservoir ensures that it sits securely in the recess,
this can clamp the tyre securely between the wheel and the inner reservoir,
the inner reservoir can then be pumped up to full pressure, for example to a high pressure of more than 8 bar, more than 10 bar or more than 12 bar,
the outer tyre can then be pumped up to the corresponding static pressure.

This single wheel arrangement is then delivered, as usual, to the vehicle assembly line or to the motor vehicle in the workshop.

Generally, according to the invention, a second air chamber is introduced into a wheel which is designed to store higher pressure than in the first air chamber. The second air chamber can be used to inflate the first air chamber quickly without a compressor.

The second air chamber is preferably disposed in the first air chamber of a standard tyre. For this reason it has no effect upon the balancing of the wheel.

The second air chamber preferably presses the standard tyre against the rim edge here.

The second air chamber preferably provides an emergency operation function.

Additional, advantageous features are given by the following claims.

The invention claimed is:

1. A method of estimating the load carried by a vehicle, comprising the steps of: determining the gas pressure (G) of a gas in a first air chamber which counteracts deformation of a tread of a wheel: supplying a gas to the first air chamber from a source of gas at a higher pressure for a predetermined time:
determining the new gas pressure (G'), or measuring the amount of gas flowing into the first chamber over the period; and estimating the load on the vehicle based on the change in gas pressure in the first air chamber or the amount of gas introduced to the first air chamber.

2. A method according to claim 1 further comprising the step of determining based on the estimated load whether the gas pressure of the gas in the first gas chamber is optimal and, if the gas pressure is not optimal supplying more gas to the first gas chamber or releasing gas from the first gas chamber.

3. A method of estimating the load carried by a vehicle comprising carrying out the method according to claim 1 on a plurality of wheels and estimating the load on the vehicle based on the change in gas pressure in each wheel.

4. A method according to claim 3 wherein the plurality of wheels are at least four wheels including a plurality of wheels on each of a plurality of axles and a plurality of sides of a vehicle.

5. A method of estimating the distribution of the load comprising carrying out the method of claim 3 and comparing the increase in gas pressure in the first chamber, or the amount of gas flowing to the first chamber over the predetermined period in the plurality of wheels.

6. A method of estimating the load carried by a vehicle, comprising the steps of: determining the gas pressure (G) of a gas in a first air chamber which counteracts deformation of a tread of a wheel: supplying a gas to the first air chamber from a source of gas at a higher pressure for a predetermined time: determining the new gas pressure (G'), or measuring the amount of gas flowing into the first chamber over the period; and estimating the load on the vehicle based on the change in gas pressure or the amount of gas introduced; wherein the source of gas at a higher pressure is a second air chamber provided in the wheel and coupled to the first air chamber in the wheel by a valve device, the first air chamber extending between the tread and the second air chamber.

7. A method according to claim 6 further comprising the step of determining the pressure in the second chamber.

8. A method according to claim 1 wherein the pressure in the first chamber is determined by a pressure sensor in the wheel.

9. A control device operable to estimate the load carried by a vehicle and/or optimise the tyre pressure based on the load, the control device operable to receive a signal indicative of the gas pressure (G) of a gas in a first air chamber which counteracts deformation of a tread of a wheel and operable to control the supply of gas to the first air chamber from a source of gas at a higher pressure for a predetermined time; wherein the control device is operable to receive a signal indicative of the new gas pressure (G'), or the amount of gas flowing into the first chamber over the period; and operable to estimate the load on the vehicle based on the change in gas pressure in the first air chamber or the amount of gas introduced to the first air chamber.

10. A control device according to claim 9 which is further operable to cause a valve to release or introduce gas from, or to, the first air chamber to optimise the gas pressure based on the estimated load, or is operable to emit a signal to display the estimated load.

11. A vehicle comprising a control device, wherein the control device is adapted to carry out the method of claim 1.

12. A vehicle according to claim 11 wherein the control device is located a distance away from the at least one wheel, the control device set up to carry out the method to estimate the load on each wheel and to control the respective valve device of each wheel and in this way to set the gas pressure to a speed-dependent and/or driving mode-dependent and/or operation-dependent specified target pressure value.

13. A vehicle according to claim 12 which is set up to estimate the load on each wheel when the vehicle is stationary, and to set the gas pressure to a specific target pressure value when the vehicle is in motion.

14. A vehicle comprising a control device, wherein the control device is adapted to carry out the method of claim 6.

15. A vehicle according to claim 14 wherein the control device is located a distance away from the at least one wheel, the control device set up to carry out the method to estimate the load on each wheel and to control the respective valve device of each wheel and in this way to set the gas pressure to a speed-dependent and/or driving mode-dependent and/or operation-dependent specified target pressure value.

16. A vehicle according to claim 15 which is set up to estimate the load on each wheel when the vehicle is stationary, and to set the gas pressure to a specific target pressure value when the vehicle is in motion.

* * * * *